(12) United States Patent
Robinson et al.

(10) Patent No.: US 9,510,157 B2
(45) Date of Patent: Nov. 29, 2016

(54) TRACKING MOBILE RESOURCE AT MANUFACTURING SITE

(71) Applicant: Caterpillar Inc., Peoria, IL (US)

(72) Inventors: Matthew M. Robinson, Peoria, IL (US); Christopher M. Sketch, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/982,055

(22) Filed: Dec. 29, 2015

(65) Prior Publication Data

US 2016/0119760 A1 Apr. 28, 2016

(51) Int. Cl.
*H04W 4/04* (2009.01)

(52) U.S. Cl.
CPC ..................................... *H04W 4/04* (2013.01)

(58) Field of Classification Search
CPC ...... G06Q 10/08; G06Q 50/24; G08G 1/144; G08G 1/096775; G08G 1/164; G08G 1/123; H04W 64/00; H04W 4/04; H04N 21/44222; H04N 21/482; H04N 1/00164; H04N 2201/3253; G06F 17/30241; G01S 5/0009
See application file for complete search history.

(56) References Cited

U.S. PATENT DOCUMENTS

| | | | |
|---|---|---|---|
| 7,062,446 B1* | 6/2006 | Suhy, Jr. | G06Q 10/087 705/1.1 |
| 7,269,469 B2 | 9/2007 | Shih et al. | |
| 7,932,827 B2* | 4/2011 | Chand | G01C 21/206 235/375 |
| 8,515,629 B2* | 8/2013 | Medwin | B66F 9/0755 701/2 |
| 2002/0194016 A1* | 12/2002 | Moribe | G01C 21/3697 701/469 |
| 2003/0217870 A1* | 11/2003 | Ridling | G01G 19/083 177/25.13 |
| 2006/0174239 A1* | 8/2006 | Dietsch | G06Q 10/06 717/169 |
| 2008/0288321 A1 | 11/2008 | Dillon et al. | |
| 2013/0030873 A1 | 1/2013 | Davidson | |
| 2013/0154854 A1* | 6/2013 | Chen | G08G 1/096741 340/905 |

FOREIGN PATENT DOCUMENTS

WO 2015086575 6/2015

* cited by examiner

*Primary Examiner* — Nizar Sivji

(57) ABSTRACT

A system for tracking a mobile resource in a manufacturing site is described. The system includes a transmitter mounted on the mobile resource to transmit a first signal indicative of a location of the mobile resource at the manufacturing site. The system also includes a transceiver disposed at the manufacturing site to receive the first signal via a wireless network and transmit a second signal indicative of a location of the mobile resource and a duration for which the mobile resource is located at the manufacturing site. The system also includes a controller to communicate with the transceiver and a database. The controller is configured to receive the second signal, identify the location of the mobile resource based on the second signal and information in a database, determine location of the mobile resource with respect to a fixed resource, and determine operational characteristics of the mobile resource.

1 Claim, 3 Drawing Sheets

TRACKING MOBILE RESOURCE AT MANUFACTURING SITE

TECHNICAL FIELD

The present disclosure relates to tracking a mobile resource, and more particularly to a system and method for tracking the mobile resource at a manufacturing site.

BACKGROUND

In order to monitor various operations in a manufacturing site, it is important to ensure that various resources of the manufacturing site, such as fixed resources and mobile resources, are as productive as possible. Typically, a centralized system is employed at the manufacturing site to monitor use of these various resources. With the development of technology, the centralized system is aided by global positioning system (GPS) to track and locate the position of each of the various resources at the manufacturing site. Upon tracking, the centralized system generates a data representative of location details of the mobile resources with respect to time. However, in cases where a number of mobile resources are deployed at the manufacturing site to assist in operation of the fixed resources and in situations where the GPS is not accessible, each mobile resource needs to be tracked with respect to its position and activity, which would otherwise be unaccounted. As such, costs associated with operation of the mobile resources may pose a difficulty while determining efficiency and utilization of the mobile resources when the position and activity of the mobile resources are unaccounted.

US patent publication number 2013/0030873 (the '873 application) describes an asset management computer system for assessing operational data indicative of movement of one or more mobile assets within a work environment. The asset management computer system may determine operational characteristics of a position segment, generate a graphical representation of the position segment, and provide operational statistics based on the position segment. The asset management computer system of the '873 application is assisted by GPS and radio frequency identification (RFID). Therefore, the '873 application fails to disclose tracking of the mobile resources at locations where GPS is not accessible.

SUMMARY OF THE DISCLOSURE

According to an aspect of the present disclosure, a system for tracking a mobile resource in a manufacturing site is described. The manufacturing site includes a fixed resource. The system includes a transmitter mounted on the mobile resource and a transceiver disposed at the manufacturing site to be in communication with the transmitter. The transmitter is configured to transmit a first signal indicative of a location of the mobile resource at the manufacturing site. The transceiver is configured to receive the first signal from the transmitter via a wireless network of the manufacturing site and transmit a second signal indicative of location of the mobile resource and a duration for which the mobile resource is located at the manufacturing site. The system further includes a database comprising information relating to a layout of the manufacturing site, a location of the fixed resource at the manufacturing site, location of the transceiver disposed at the manufacturing site, and the mobile resources at the manufacturing site. The system further includes a controller in communication with the transceiver and the database. The controller is configured to receive the second signal from the transceiver and identify the location of the mobile resource at the manufacturing site based on the second signal received from the transceiver and the information stored in the database. The controller is further configured to determine a location of the mobile resource at the manufacturing site with respect to the fixed resource at the manufacturing site. Based on the fixed resource associated with the mobile resource and the duration for which the mobile resource is located at the manufacturing site, the controller is further configured to determine operational characteristics of the mobile resource which includes a utilization factor of the mobile resource and at least one type of activity performed by the mobile resource based on the second signal received.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
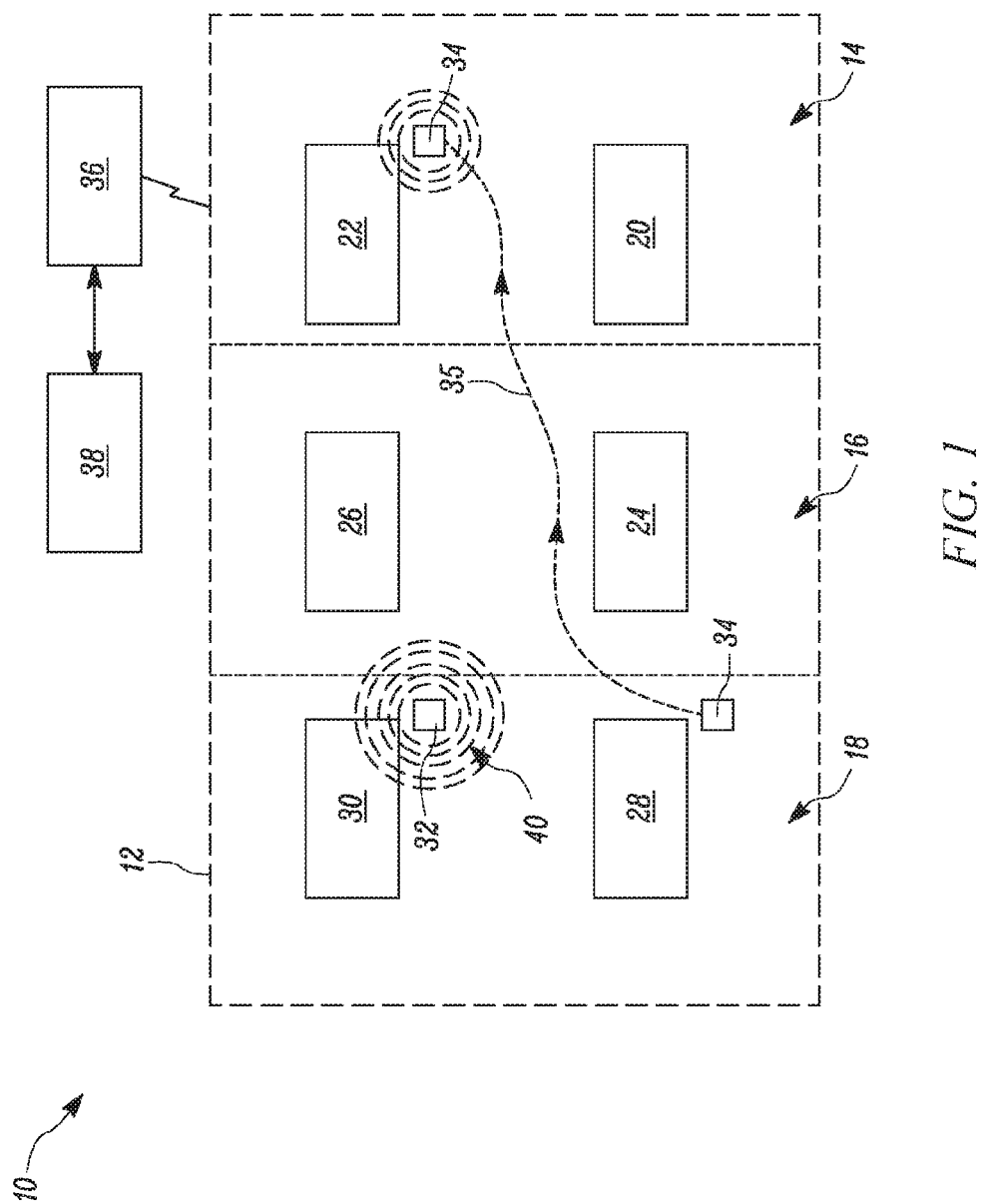
FIG. 1 is a block diagram of a system for tracking a mobile resource in a manufacturing site, according to an embodiment of the present disclosure.

Referring to FIG. 1, a system 10 implemented in a manufacturing site 12 is illustrated. The manufacturing site 12 includes multiple operation blocks, such as, a first operation block 14, a second operation block 16, and a third operation block 18 for performing one or more operations. Each of these operation blocks may include one or more work machines. In one embodiment, the manufacturing site 12 may include multiple fixed resources and multiple mobile resources. For instance, the first operation block 14 of the manufacturing site 12 includes a first fixed resource 20 and a second fixed resource 22; the second operation block 16 of the manufacturing site 12 includes a third fixed resource 24 and a fourth fixed resource 26; and the third operation block 18 of the manufacturing site 12 includes a fifth fixed resource 28 and a sixth fixed resource 30. Further, the manufacturing site 12 includes, but is not limited to, a first mobile resource 32 and a second mobile resource 34. FIG. 1 shows the second mobile resource 34 being moved from the third operation block 18 to the first operation block 14 along a path 35. The first mobile resource 32 and the second mobile resource 34 are hereinafter alternatively and commonly referred to as the mobile resource(s) 32 and 34. In one example, the fixed resource may be, but is not limited to, a lathe machine and the mobile resource(s) 32 and 34 may be a device used to store coolant that is utilized during the operation of the lathe machine. In general, the mobile resource(s) 32 and 34 may be embodied as any machine or device that assists in operation of the fixed resources.

In an embodiment of the present disclosure, the system 10 includes a transmitter 42 (shown in FIG. 2) mounted on each of the mobile resources 32 and 34. The transmitter 42 transmits a first signal 44 indicative of a location of the mobile resources 32 and 34 at the manufacturing site 12. The system 10 further includes a controller 36 disposed at the manufacturing site 12 to communicate with at least one transceiver (shown in FIG. 2) and a database 38. In an example, the controller 36 may be a processor that includes a single processing unit or a number of units, all of which include multiple computing units. The term 'processor' as used herein, should not be construed to refer exclusively to hardware capable of executing a software application. Rather, in this example, the controller 36 may be implemented as one or more microprocessors, microcomputers, digital signal processors, central processing units, state machines, logic circuitries, and/or any devices that are capable of manipulating signals based on operational instructions. Among the capabilities mentioned herein, the controller 36 may also be configured to receive, transmit, and execute computer-readable instructions.

Further, the database 38 may be understood as a repository containing a large amount of information relating to a layout of the manufacturing site 12 such as, a number of fixed resources at the manufacturing site 12, a number of mobile resources deployed at the manufacturing site 12, a number of operation blocks at the manufacturing site 12, a location of the fixed resources at the manufacturing site 12, a location of transceiver disposed at the manufacturing site 12. In one example, the database 38 may be one of an internal database or an external database associated with the manufacturing site 12. Here, the phrase 'internal database' may be understood as a database located within the manufacturing site 12 and the phrase 'external database' may be understood as a database that is located outside the manufacturing site 12, but still associated with the manufacturing site 12. In addition, the information contained in database 38 may be updated, whenever required. For instance, addition of a new fixed resource, or a new mobile resource, or any variation in boundary of the operation blocks may be updated to the database 38. The database 38 may be embodied as web servers and external repositories, and accordingly various interfaces may be provided to facilitate the communication between the controller 36 and the database 38. In one example, the interfaces may be wired networks. As such, the controller 36, the database 38, the transmitter 42 (shown in FIG. 2), and the transceiver 46, 48, 50 (shown in FIG. 2) assists in establishing a wireless network of the manufacturing site 12.

According to the present disclosure, an operator may be able to determine the movement of the mobile resources 32 and 34 within and across the operation blocks and accordingly, the duration for which the mobile resources 32 and 34 are operating at the manufacturing site 12. In one example, the operator may be able to view such details in a user device (not shown) that is coupled to the controller 36. The duration for which the mobile resources 32 and 34 are operating at the manufacturing site 12 may be represented by bands or contours 40 around the mobile resource 32 and 34, as shown in FIG. 1.

Figure 2:
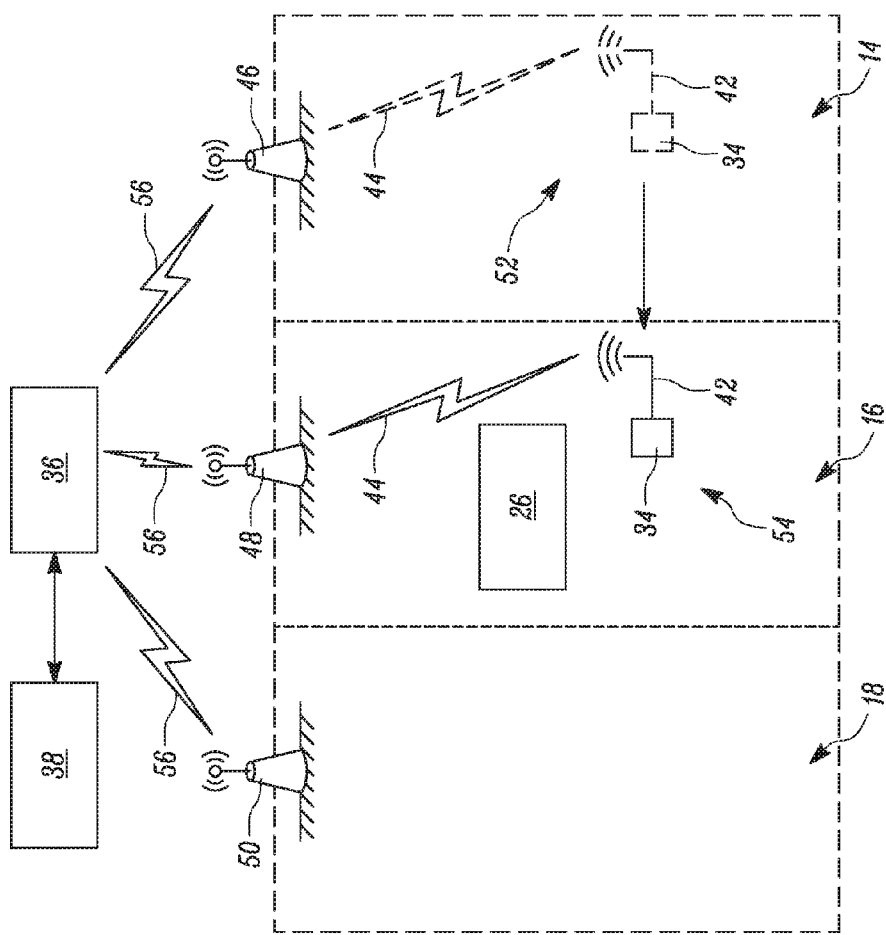
FIG. 2 illustrates an operation of the system of FIG. 1.
Figure 3:
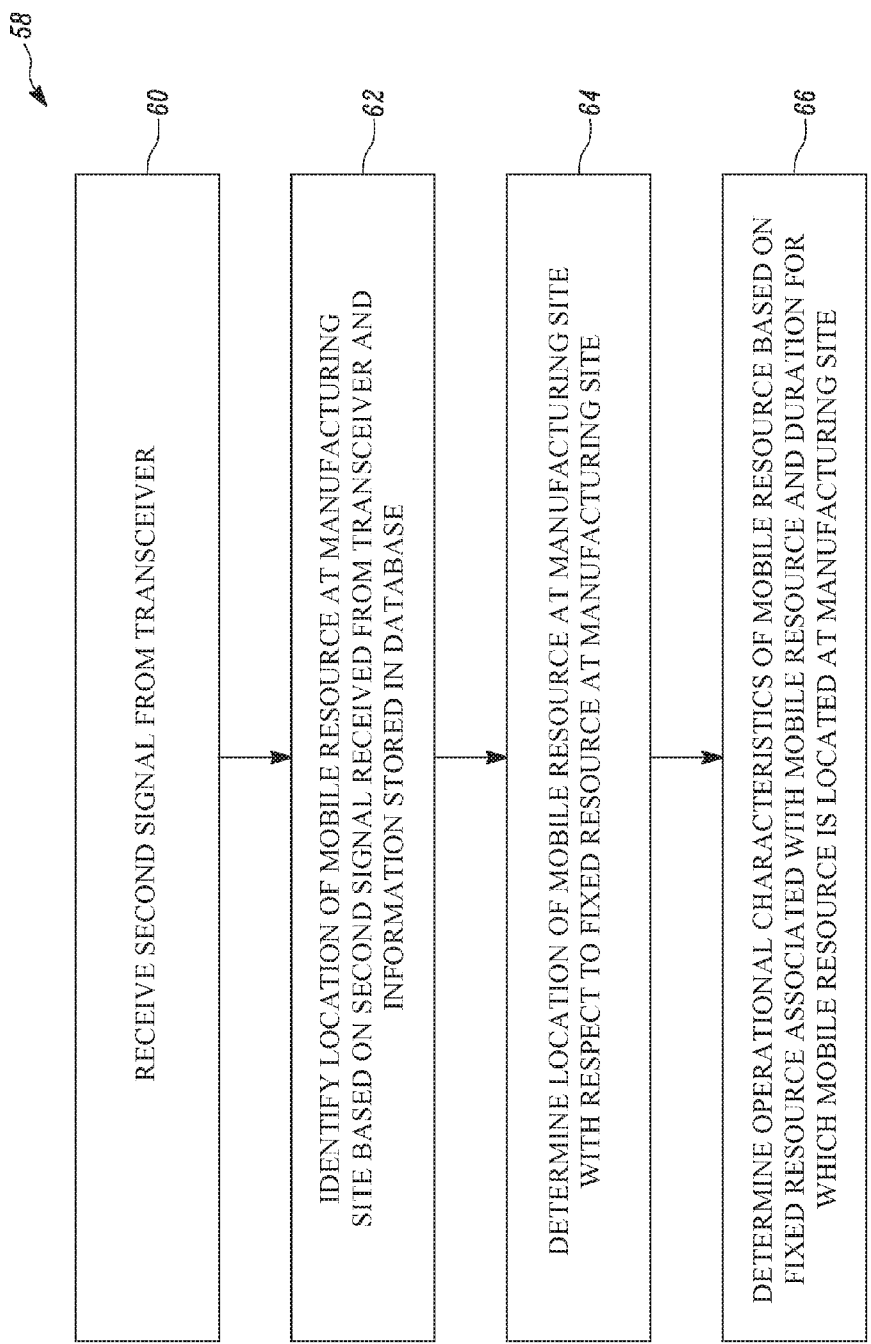
FIG. 3 is a flowchart of a method for tracking the mobile resource at the manufacturing site.

FIG. 2 illustrates an operation of the system 10. For the purpose of convenience and clarity in description, the FIG. 2 will be described with reference to the fourth fixed resource 26, hereinafter referred to as the fixed resource 26, and the mobile resource 34. As mentioned earlier, the transmitter 42 is mounted on the mobile resource 34 to transmit the first signal 44 indicative of the location of the mobile resource 34 at the manufacturing site 12. In one example, the transmitter 42 may be electronic equipment, or an electrical circuit within another electronic device as known in the art, that is capable of transmitting the first signal 44. The transmitter 42 may emit the first signal 44 either continuously or at regular intervals, to indicate the location of the mobile resource 34. For the purpose of indicating the location of the mobile resource 34, one or more sensors may be mounted on the mobile resource 34 and the transmitter 42 may be coupled to the sensors to receive inputs indicative of the operation block of the manufacturing site 12. On receiving inputs from the sensors, the transmitter 42 may convert the inputs into electromagnetic waves so that the first signal 44 may be propagated through air. As such, in an example, the transmitter 42 may embody an antenna.

Further, as described earlier, the system 10 includes a first transceiver 46 disposed in the first operation block 14, a second transceiver 48 disposed in the second operation block 16, and a third transceiver 50 disposed in the third operation block 18 of the manufacturing site 12. The term 'transceiver' refers to a device that includes a transmitter and a receiver combined and sharing a common circuitry and housing. In one example, RF transceivers may be employed by the system 10 for high speed data transmission. These transceivers are disposed in communication with the transmitter 42. Accordingly, the transceiver 46, 48, 50 receives the first signal 44 from the transmitter 42 via the wireless network of the manufacturing site 12. As such, the location of the mobile resource 34 may be determined based on the first signal 44.

For instance, FIG. 2 shows a first position 52 of the mobile resource 34. In the first position 52, the mobile resource 34 is located in the first operation block 14 of the manufacturing site 12. While the mobile resource 34 is stationed in the first operation block 14, the transmitter 42 transmits the first signal 44 to the first transceiver 46, indicating that the mobile resource 34 is in the first operation block 14. In other words, the first signal 44 is transmitted by the transmitter 42 when the mobile resource is present in the first operation block 14, irrespective of the location of the mobile resource 34 within the first operation block 14. Therefore, it will be understood that the first transceiver 46 is disposed in the first operation block 14 such that the first transceiver 46 is capable of receiving the first signal 44 from the transmitter 42, irrespective of the location of the mobile resource 34 within the first operation block 14. Alternatively, when the first operation block 14 spreads over a large area, multiple first transceivers 46 may be disposed in the first operation block 14 to receive the first signal 44.

When the mobile resource 34 travels from the first position 52 in the first operation block 14 to a second position 54 in the second operation block 16, the first signal 44 transmitted by the transmitter 42 is received by the second transceiver 48 of the second operation block 16. Specifically, the FIG. 2 illustrates a scenario when the mobile resource 34 was not operating in the first operation block 14, and based on its requirement is moved to the second operation block 16 to assist in operation of the fixed resource 26. As mentioned earlier, the transmitter 42 transmits the first signal 44 continuously to the first transceiver 46 when the mobile resource 34 is in the first operation block 14 and transmits the first signal 44 to the second transceiver 48 when the mobile resource is in the second operation block 16. In such a condition, the first transceiver 46 and the second transceiver 48 may determine, respectively, a duration for which the first signal 44 has been received from the transmitter 42. Accordingly, a duration for which the mobile resource 34 is located in the respective operation block of the manufacturing site 12 may be determined. Further, on receipt of the first signal 44 from the transmitter 42, the first transceiver 46 and the second transceiver 48, at the respective operation blocks, transmits a second signal 56 indicative of the location of the mobile resource 34 and a duration for which the mobile resource 34 is located at the manufacturing site 12.

Further, the controller 36 is disposed in communication with the transceivers 46, 48, 50, and the database 38. As such, the controller 36 receives the second signal 56 from the first transceiver 46 and the second transceiver 48. On receipt of the second signal 56, the controller 36 identifies the location of the mobile resource 34 at the manufacturing site 12 based on the second signal 56 and the information stored in the database 38. For example, when the controller 36 receives the second signal 56 from the first transceiver 46, the controller 36 may gather information from the database 38 based on the second signal 56, and accordingly may determine that the mobile resource 34 is located in the first operation block 14. Such determination may be due to the signals received from the first transceiver 46. Subsequently, when the mobile resource moves from the first position 52 to the second position 54, at the boundary of the operation block, both the first transceiver 46 and the second transceiver 48 may receive the first signal 44 from the mobile resource 34. In such cases, the controller 36 may determine that the mobile resource 34 has traveled from the first operation block 14 to the second operation block 16. Furthermore, when the mobile resource 34 is stationed in the second operation block 16, the controller 36 may determine that the mobile resource 34 is positioned in the second operation block 16 based on the second signal 56 received from the second transceiver 48. It will be understood that the second signal 56 transmitted from the first transceiver 46 and the second transceiver 48 may vary with respect to a transmission parameter, such as, but not limited to, bandwidth and frequency. These information relating to the transmission parameter associated with the transceivers 46, 48, 50 may also be stored in the database 38, so that the controller 36 can differentiate between the second signal 56 received from the transceivers 46, 48, 50. To that end, the controller 36 can determine the location of the mobile resource 34 based on the second signal 56.

Once the controller 36 has determined the location of the mobile resource 34 with respect to the layout of the manufacturing site 12, the controller 36, subsequently, determines the location of the mobile resource 34 with respect to the fixed resource 26 at the manufacturing site 12. For instance, once the controller 36 has determined that the mobile resource 34 is located in the second operation block 16, the controller 36 may gather information regarding the fixed resources located in the second operation block 16. In this case, the controller 36 associates the mobile resource 34 with the fixed resource 26 in the second operation block 16. However, in cases where there are multiple fixed resources located in the second operation block 16, multiple transceivers may be disposed to efficiently track the movement of the mobile resource 34 and accordingly associate the mobile resource 34 with a fixed resource. Therefore, the controller 36 receives or determines the location of the mobile resource 34, the fixed resource 26 associated with the mobile resource 34, and the duration for which the mobile resource 34 is associated with the fixed resource 26.

Based on this information, the controller 36 determines operational characteristics of the mobile resource 34. The operational parameters, in one example, include a utilization factor of the mobile resource 34 and at least one type of activity performed by the mobile resource 34 based on the second signal 56. The utilization factor may be understood as a ratio of duration for which the mobile resource 34 is associated with the fixed resource 26 to a total duration of the mobile resource 34 at the manufacturing site 12. As mentioned earlier, the user device may be in communication with the controller 36. Alternatively, the controller 36 may be located in the user device and the controller 36 may provide a visual representation of the layout of the manufacturing site 12 and the utilization factor of the mobile resource 34. In addition, the controller 36 may also provide a visual representation of the duration for which the mobile resource 34 is located in an operation block of the manufacturing site 12. In one example, the duration may be illustrated in a form of the contours 40, as shown in FIG. 1.

Various embodiments disclosed herein are to be taken in the illustrative and explanatory sense, and should in no way be construed as limiting of the present disclosure.

INDUSTRIAL APPLICABILITY

The present disclosure relates to the system 10 for tracking the mobile resource 34 at the manufacturing site 12. Owing to the transmission of the first signal 44 from the mobile resource 34 and the transmission of the second signal 56 from the transceivers 46, 48, 50, the present disclosure provides an internal wireless network at the manufacturing site 12, thereby overcoming a requirement of any GPS tracking of the mobile resource 34. As such, the system 10 may facilitate tracking of the mobile resource 34 even at locations where GPS is not accessible. Further, the system 10 of the present disclosure also facilitates in determining the utilization factor of the mobile resource 34, without complex processes.

Further, the present disclosure also provides a method 58 for tracking the mobile resource 34 at the manufacturing site 12. FIG. 4 illustrates a flow chart of the method 58. The steps in which the method 58 is described are not intended to be construed as a limitation, and any number of steps can be combined in any order to implement the method 58. Further, the method 58 may be implemented in any suitable hardware, such that the hardware employed can perform the steps of the method 58 readily and on a real-time basis.

For the purpose of illustration, various steps of the method 58 are described in conjunction with FIGS. 1 and 2 of the present disclosure. At step 60, the method 58 includes receiving the second signal 56 from the transceiver, such as the first transceiver 46 and the second transceiver 48. The second signal 56 is transmitted by the transceiver based on the first signal 44 received from the transmitter 42.

At step 62, the method 58 includes identifying the location of the mobile resource 34 at the manufacturing site 12 based on the second signal 56 received from the transceiver 46, 48, 50, and the information stored in the database 38. The second signal 56 transmitted by the transceiver 46, 48, 50 is indicative of the location of the mobile resource at the manufacturing site 12 and the duration for which the mobile resource is located at the manufacturing site 12. At step 64, the method 58 includes determining a location of the mobile resource 34 at the manufacturing site 12 with respect to the fixed resource 26 at the manufacturing site 12. Further, at step 66, the method 58 includes determining operational characteristics of the mobile resource 34 based on the fixed resource 26 associated with the mobile resource 34 and the duration for which the mobile resource 34 is located at the manufacturing site 12, wherein the operational characteristics include a utilization factor of the mobile resource 34 and at least one type of activity performed by the mobile resource 34 based on the second signal 56 received.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system for tracking a mobile resource at a manufacturing site, wherein the manufacturing site includes a fixed resource, the system comprising:
　a transmitter mounted on the mobile resource, the transmitter configured to transmit a first signal indicative of a location of the mobile resource at the manufacturing site;
　a transceiver disposed at the manufacturing site and configured to be in communication with the transmitter, the transceiver configured to:
　　receive the first signal from the transmitter via a wireless network of the manufacturing site; and
　　transmit a second signal indicative of the location of the mobile resource at the manufacturing site and a duration for which the mobile resource is located at the manufacturing site;
　a database comprising information relating to a layout of the manufacturing site, a location of the fixed resource at the manufacturing site, location of the transceiver disposed at the manufacturing site, and the mobile resource at the manufacturing site; and
　a controller in communication with the transceiver and the database, the controller configured to:
　　receive the second signal from the transceiver;
　　identify the location of the mobile resource at the manufacturing site based on the second signal received from the transceiver and the information stored in the database;
　　determine a location of the mobile resource at the manufacturing site with respect to the fixed resource at the manufacturing site; and
　　determine operational characteristics of the mobile resource based on the fixed resource associated with the mobile resource and the duration for which the mobile resource is located at the manufacturing site, wherein the operational characteristics include a utilization factor of the mobile resource and at least one type of activity performed by the mobile resource based on the second signal received.

* * * * *